United States Patent
Vegini et al.

(10) Patent No.: US 12,191,734 B2
(45) Date of Patent: Jan. 7, 2025

(54) ROTOR, ROTARY ELECTRIC MACHINE AND AXIAL RETAINING DEVICE

(71) Applicant: WEG EQUIPAMENTOS ELÉTRICOS S/A, Jaraguá do Sul (BR)

(72) Inventors: Thiago Vegini, Joinville (BR); Lucas Gomes Fonçatti, Jaraguá do Sul (BR); Lucas Schwengber Ramos, Jaraguá do Sul (BR); Fernando Vitoriano Fernandes, Jaraguá do Sul (BR)

(73) Assignee: WEG EQUIPAMENTOS ELÉTRICOS S/A, Jaraguá do Sul (BR)

( * ) Notice: Subject to any disclaimer, the term of this patent is extended or adjusted under 35 U.S.C. 154(b) by 228 days.

(21) Appl. No.: 17/928,399

(22) PCT Filed: May 29, 2020

(86) PCT No.: PCT/BR2020/050191
§ 371 (c)(1),
(2) Date: Nov. 29, 2022

(87) PCT Pub. No.: WO2021/237319
PCT Pub. Date: Dec. 2, 2021

(65) Prior Publication Data
US 2023/0208239 A1 Jun. 29, 2023

(51) Int. Cl.
*H02K 3/51* (2006.01)
*H02K 3/50* (2006.01)
*H02K 11/00* (2016.01)

(52) U.S. Cl.
CPC ........................... *H02K 3/51* (2013.01)

(58) Field of Classification Search
CPC ............. H02K 11/00; H02K 3/50; H02K 3/51
(Continued)

(56) References Cited

U.S. PATENT DOCUMENTS

| 2,844,746 A | * | 7/1958 | Coggeshall | H02K 3/51 |
| | | | | 310/270 |
| 4,656,382 A | * | 4/1987 | Moore | H02K 3/51 |
| | | | | 310/58 |

(Continued)

FOREIGN PATENT DOCUMENTS

| GB | 1143595 | 7/1958 |
| JP | S5983550 | 5/1984 |

(Continued)

OTHER PUBLICATIONS

International Search Report for PCT/BR2020/050191 dated Dec. 22, 2020.

*Primary Examiner* — Jose A Gonzalez Quinones
(74) *Attorney, Agent, or Firm* — B. Aaron Schulman, Esq.; Stites & Harbison, PLLC

(57) ABSTRACT

A rotor for a rotary electric machine is provided, with a pack of plates mounted on a shaft, in which said pack of plates has two coil head regions, the rotor having at least one axial retaining device positioned in one of the two coil head regions; the axial retaining device includes a substantially flat base positioned in said one of the two coil head regions and at least one resilient element fastened to a face of the substantially flat base oriented in a direction opposite said one of the two coil head regions.

10 Claims, 3 Drawing Sheets

(58) Field of Classification Search
USPC .................................. 310/216.131, 260, 270
See application file for complete search history.

(56) References Cited

U.S. PATENT DOCUMENTS

| | | | | |
|---|---|---|---|---|
| 5,355,046 A | * | 10/1994 | Weigelt | .................. H02K 3/505 |
| | | | | 174/DIG. 20 |
| 6,018,209 A | | 1/2000 | Kato et al. | |
| 6,724,124 B2 | | 4/2004 | Niimi et al. | |

FOREIGN PATENT DOCUMENTS

| | | | | |
|---|---|---|---|---|
| JP | 2015002638 | | | 1/2015 |
| JP | 2015002638 A | * | | 1/2015 |

\* cited by examiner

ROTOR, ROTARY ELECTRIC MACHINE AND AXIAL RETAINING DEVICE

FIELD OF THE INVENTION

The present invention relates to the field of rotatory electric machines with wound rotor with cylindrical poles.

BACKGROUND ART

Rotatory electric machines are equipment used to transform electrical energy into mechanical energy, in the case of motors, and vice versa, in the case of generators. They consist essentially of four basic structures: rotor, stator, bearings and housing.

In the case of rotor, one of the forms of construction is the so-called wound rotor, which consists of an iron core, called a pack of plates, obtained from the stacking of a certain number of steel plates, containing slots or simply housings arranged at the end of the sheet, which will be filled by coils composed of conductive material, such as copper wires or bars.

The coils can, among other configurations known in the field, be formed from a continuous wire of conductive material, such as copper, wrapped in at least one layer of insulating material, each layer of wire being arranged on top of another within the said slots. In this way, each coil is composed of a stack of insulated copper wires with a helical final shape, since the wire is continuous and continuously arranged until it fills the slot in its entirety. Several coils are arranged inside the slots forming the turns and these, when grouped, form the poles.

As the coil constitutes a closed path, its ends are arranged in a region external to the rotor package, called the coil head.

The operation of the electric machine causes a rise in temperature of the assembly, which, in turn, can lead to thermal expansion of the coil head.

When the coil head expands uncontrollably, i.e. without any structural limitation, the coil head can move excessively in the axial direction, causing the turns of the coil to slump.

On the other hand, the use of a rigid structural limiter can lead to a shortage of space for expansion, causing structural damage to the rotor.

Thus, the need remains in the state of the art for a technical solution that is capable of providing controlled freedom for the displacement of the coil head when it is axially dilated, without, however, allowing the turns of the coil to slump.

AIMS OF THE INVENTION

It is one of the aims of the invention to provide a technical solution that is capable of providing a controlled freedom for the displacement of the coil head during its axial expansion, without allowing the slumping of the coils grouped in the same slot of the rotor package to occur, called turns of coil.

It is another aim of the invention to provide an axial retaining device for the coil head of rotatory electric machines, whose device provides controlled freedom for the displacement of the coil head when it is axially dilated.

It is one more aim of the present invention to provide an axial retaining device for the coil head of rotatory electric machines, whose device is capable of maintaining the integrity of the coil head during the operation of the rotatory electric machine, but at the same time, it has enough resilience to support and absorb some axial movement of the coil head.

BRIEF DESCRIPTION OF THE INVENTION

The present invention achieves the above aims by means of a rotor for a rotatory electric machine comprising a pack of plates mounted on a shaft, wherein said pack of plates comprises a region provided with slots in which coils are housed and two head regions of coil in which the ends of the coils are external to the pack of plates, the rotor further comprising a closing cover to be connected to each of the two coil head regions by a corresponding support disc. The rotor further comprises at least one axial retaining device positioned in one of the two coil head regions, the axial retaining device comprising a substantially flat base positioned in said one of the two coil head regions, and at least one resilient member attached to a face of the substantially flat base facing in a direction opposite to said one of the two coil head regions. The at least one resilient element is in contact with the corresponding support disc.

In one embodiment of the present invention, the substantially flat base comprises two recesses disposed on opposite edges of the substantially flat base, the two recesses being arranged in corresponding positions on the two opposite edges forming anchoring points for a lashing strap for lashing the axial retaining device to said one of the two coil head regions; and the axial retaining device comprises at least two resilient elements spaced apart so as to form a gap through which the lashing strap passes.

In another embodiment of the present invention, the axial retaining device comprises two pairs of resilient elements, the pairs of resilient elements being spaced from each other to form a gap through which the lashing strap passes.

In one embodiment of the invention, the substantially flat base is made of laminated insulating composite material, the direction of lamination of the material being the direction of attachment of the axial retaining device to the coil head, and the at least a resilient element is formed from silicone.

The substantially flat base may comprise at least one niche for receiving at least one resilient element, at least one resilient element being vulcanized in the substantially flat base; and the at least one niche may have a central recess configured to receive a corresponding shoulder of the at least one resilient element.

Preferably, the rotor comprises an axial retaining device disposed at each of the poles of said one of the two coil head regions.

The present invention also contemplates a rotatory electric machine having the rotor and the axial retaining device of the present invention.

BRIEF DESCRIPTION OF THE DRAWINGS

The present invention will be described in more detail below, with reference to the accompanying drawings, in which.

DETAILED DESCRIPTION OF THE INVENTION

The present invention will be described below based on embodiments shown in FIGS. 1 to 6.

Figure 1:
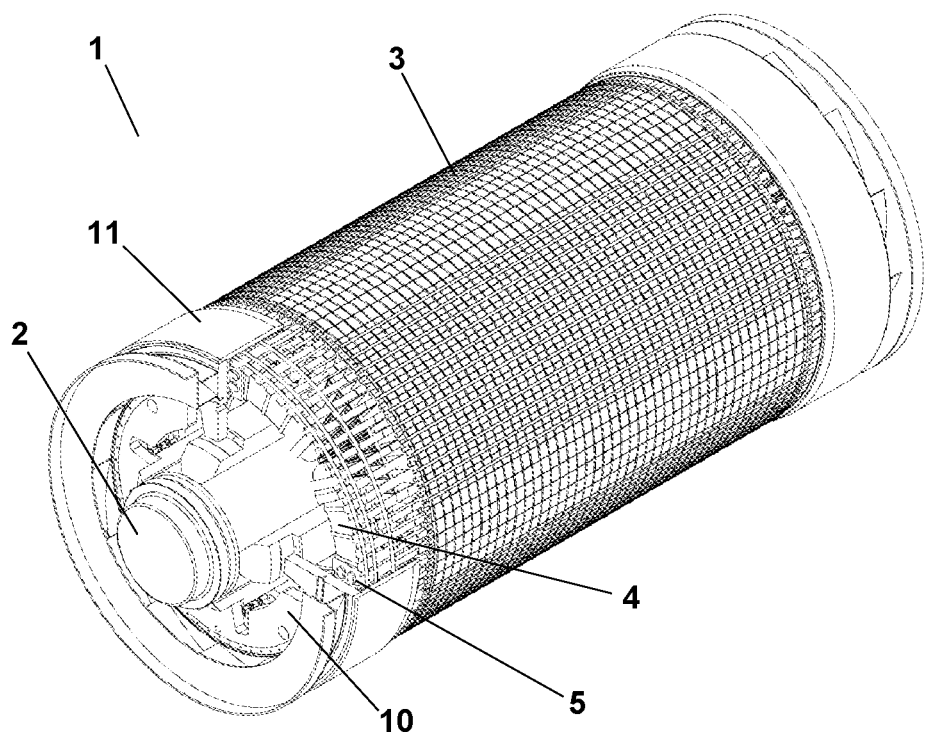
FIG. 1—is a perspective view of a cylindrical pole-type rotatory electric machine rotor according to an embodiment of the present invention.

FIG. 1 shows a rotor (1) applied in cylindrical pole type rotatory electric machines, composed simply of a shaft (2) and a pack of plates (3), also called the rotor package, in which the coils (4) of the conductive element are inserted. FIG. 1 further illustrates, in cross-section, an axial support (10) of the radial retaining cover (11) of the rotor. It is understood that a person skilled in the art would have no difficulty in understanding that the rotor may include other components not described herein, so that only the elements relevant to the understanding of the present invention will be described and presented.

The rotor package (3) can be divided into three portions: a first region where the coils are inserted into slots and remain internal to the pack of plates, and two end regions, more commonly called rotor coil heads, where the ends of the coils (4) are external to the pack of plates (3). The coils (4) when grouped in the same slot are called turns.

The rotor according to the present invention further comprises at least one axial retaining device (5) positioned externally to the coil head, more specifically between the last turn of the coil head and an axial support (10) of the rotor radial retaining cover 1.

The rotor shown in FIG. 1 has four poles. Thus, in the illustrated embodiment, the rotor comprises eight axial retaining devices (5), one on each rotor pole (1), four at one end of the rotor and four at the opposite end of the rotor.

Figure 2:
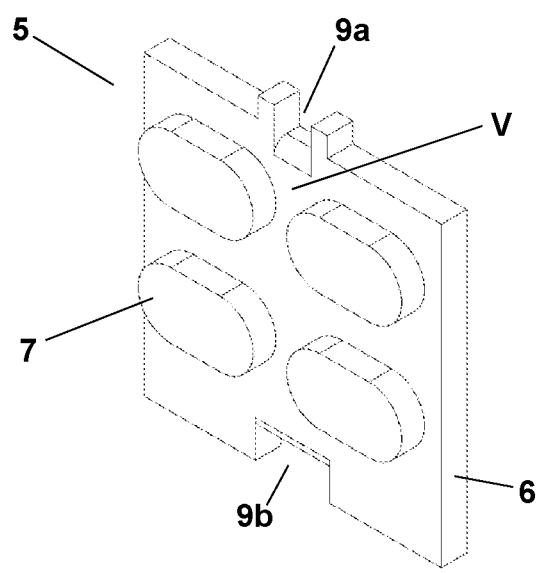
FIG. 2—is a perspective view of an axial retaining device according to an embodiment of the present invention.

FIG. 2 shows a perspective view of the radial retaining device.

The axial retaining device (5) comprises a substantially flat base (6) where at least one resilient element (7) is arranged.

Figure 3:
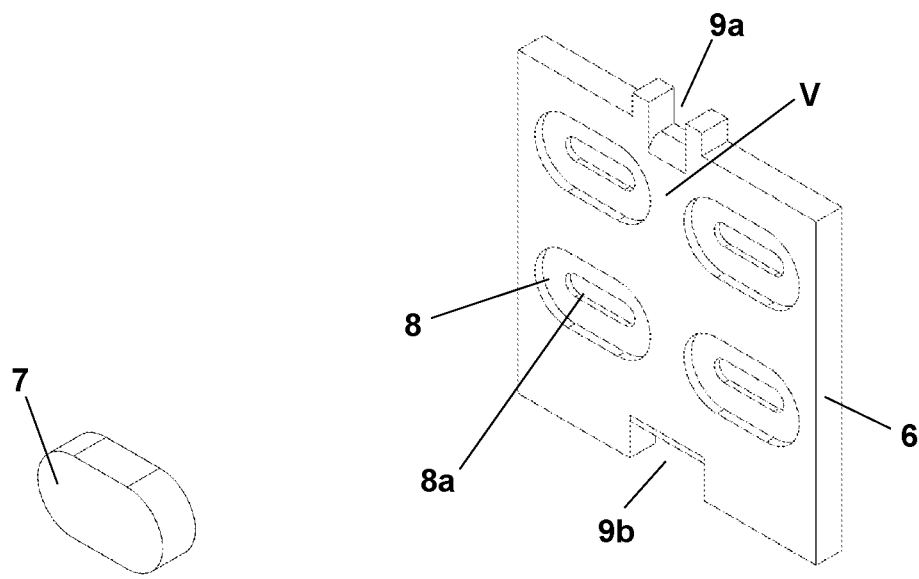
FIG. 3—is a schematic illustration of components of the axial retaining device according to an embodiment of the present invention.

As best illustrated in FIG. 3, the substantially flat base (6) has at least one niche (8) for receiving the at least one resilient element (7) and at least two corresponding indentations (9a, 9b) which are used as anchoring points for lashing the axial retaining device (5) with bandage tapes to the coil head.

In this context, the lashing is preferably performed against the outermost turn of coil, making a complete turn along the entire axial extension of the turn. That is, the bandage tape is arranged in such a way as to "embrace" the height of the outermost turn in that portion where it is planned. The bandage material used is normally a pre-impregnated fiberglass tape composed with polyester resin, but any insulating material applied to electric machines can be used, as long as the thermal class temperature of the electric machine is observed.

Thus, the two indentations (9a, 9b) are arranged on opposite edges of the substantially flat base (6) in corresponding positions on opposite edges.

In the preferred embodiment of the present invention shown in the figures, the axial retaining device (5) comprises a substantially flat base (6) has four spaced oval niches (8) for receiving four oval resilient elements (7).

In the preferred embodiment of the present invention shown in the figures, the axial retaining device (5) comprises a substantially flat base (6) that has four spaced oval niches (8) for receiving four oval resilient elements (7), so that the lashing bandage tape is arranged in that gap. If necessary, the lashing can be performed by turns of the tape, the folded portions of the tape being overlapped in the gap.

In this sense, it should be noted that the axial retaining device (5) according to the present invention can comprise a different amount of resilient elements (7), and the resilient elements can have different formats. For example, in one embodiment of the present invention, the axial retaining device may comprise two spaced apart oblong resilient elements, the spacing between the elements forming the lashing gap. In another embodiment, the axial retaining device may comprise two rows of circular resilient elements whose spacing between the rows forms the lashing gap.

As best illustrated in FIG. 3, in one embodiment of the present invention, the substantially flat base (6) is formed from an insulating composite material, such as an epoxy resin-impregnated fiberglass laminate, the rolling direction of the material being the lashing direction of the device to the coil head, that is, parallel to the faces of the base.

In the case of this lamination, the layers of the composite material are subjected to compression against the face of the coil head, which is the ideal direction of operation for composite materials such as those made of fiberglass, which generally does not have good tensile strength.

The resilient elements (7) are preferably made of silicone and vulcanized in the niches (8) of the substantially flat base (6).

Figure 4:
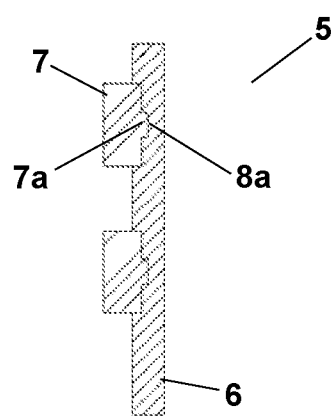
FIG. 4—is a cross-sectional view of the axial retaining device according to an embodiment of the present invention.

Thus, as best illustrated in FIGS. 3 and 4, in an embodiment of the present invention, each of the niches (8) has a central recess (8a) that receives a corresponding shoulder (7a) of the resilient element (7). This configuration helps the process of fixing the resilient elements.

The axial retaining device (5) according to the present invention is positioned over the most extreme portion of the coil head (4), so that the substantially flat base (6) is positioned over the last turn of the head coil (4), with the face having the resilient elements (7) facing away from the coil head.

Figure 5:
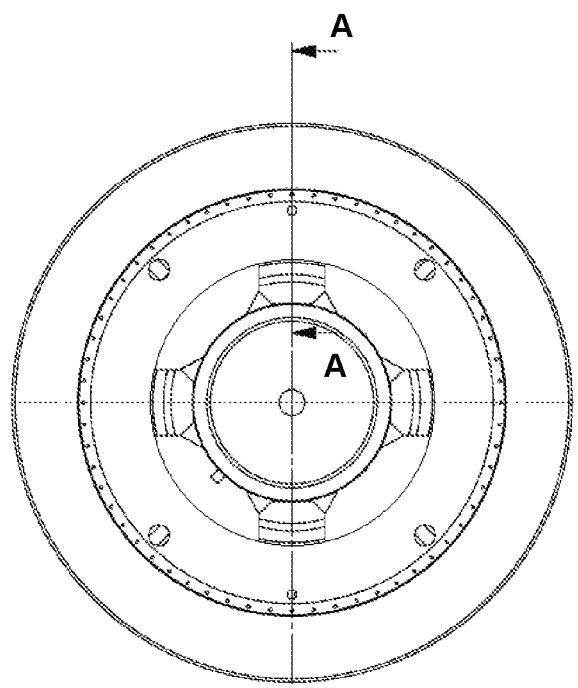
FIG. 5—is a front view of a cylindrical pole type rotatory electric machine rotor according to an embodiment of the present invention.
Figure 6:
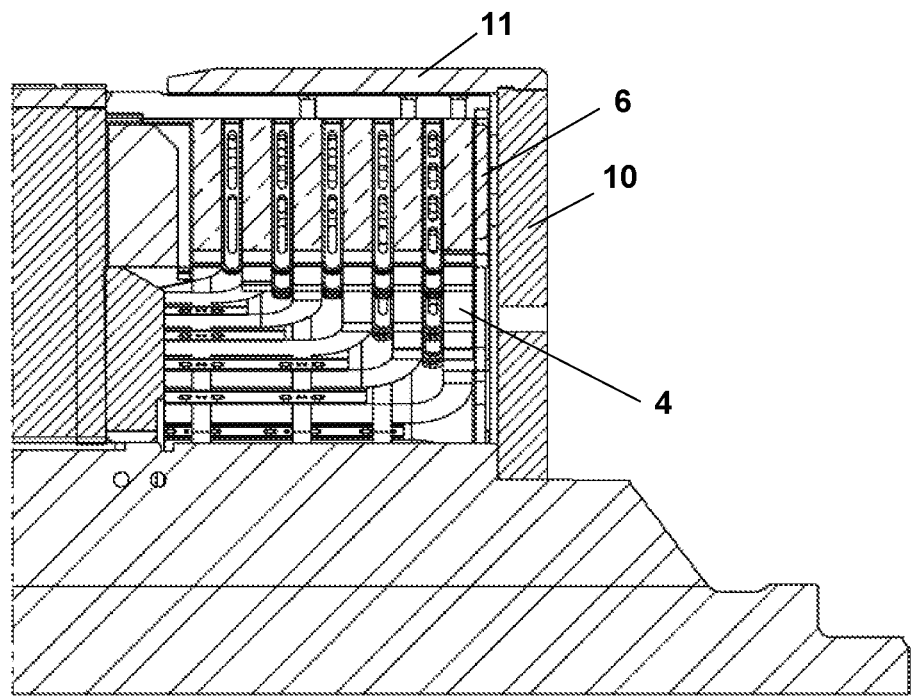
FIG. 6—is a sectional view taken along the AA section shown in FIG. 5.

FIG. 6 shows a sectional view taken from the AA section shown in FIG. 5. As shown in FIG. 6 and as known by those skilled in the art, the rotor is closed radially by a cover (11), preferably forged in steel, which is fixed to the rotor end by a support disc (10). Cover (11) and support disc (10) are commonly referred to as the "steel cover assembly".

Thus, after closing the rotor, the resilient elements (7) of the axial retaining device (5) are in contact with the support disc (10), so that the axial movement of the coil head causes the device to be pressed between the coil head and the support disc (10). With the pressure against the device, the compression of the resilient material of the resilient elements (7) occurs.

This compression of the resilient elements (7) results in a control of the intensity of the axial displacement, so that the axial retaining device (5) provides a controlled freedom for the displacement of the coil head during its axial expansion.

Thus, the resilient elements (7) provide sufficient compressibility to absorb the axial expansion of the coil head (4), controlling the axial displacement of the coil head.

Having described examples of preferred embodiments of the present invention, it should be understood that the scope of the present invention encompasses other possible variations of the inventive concept described, being limited only by the content of the appended claims, including the possible equivalents.

The invention claimed is:

1. A rotor for a rotatory electric machine, comprising a pack of plates mounted on a shaft, wherein said pack of plates comprises a region provided with slots, in which coils and two coil head regions are housed, wherein the ends of the coils are external to the pack of plates, the rotor further comprising a closing cover to be connected in each of the two coil head regions by a corresponding support disc, the rotor further comprising at least one axial retaining device positioned in one of the two coil head regions, the at least one axial retaining device comprising:
- a substantially flat base positioned in said one of the two coil head regions; and
- at least one resilient element fixed to a face of the substantially flat base facing in a direction opposite to said one of the two coil head regions;
- wherein the at least one resilient element is in contact with the corresponding support disc (10).

2. The rotor according to claim 1, wherein:
- the substantially flat base comprises two indentations arranged on opposite edges of the substantially flat base, the two indentations being arranged in corresponding positions on the opposite edges, forming anchoring points for lashing strap to lash the axial retaining device to said one of the two coil head regions;
- the axial retaining device comprising at least two resilient elements spaced so as to form a gap through which the lashing strap passes.

3. The rotor according to claim 2, wherein the axial retaining device comprises two pairs of resilient elements, the pairs of resilient elements being spaced from each other so as to form a gap through which the lashing strap passes.

4. The rotor according to claim 1, wherein the substantially flat base is manufactured with a laminate of insulating composite material, wherein the rolling direction of the material is the lashing direction of the axial retaining device to the coil head.

5. The rotor according to claim 1, wherein the at least one resilient element is made of silicone.

6. The rotor according to claim 5, wherein the substantially flat base comprises at least one niche for receiving the at least one resilient element, the at least one resilient element being vulcanized to the substantially flat base; the at least one niche having a central recess configured to receive a corresponding shoulder of the at least one resilient element.

7. The rotor according to claim 1, further comprising an axial retaining device arranged in each of the poles of said one of the two coil head regions.

8. An electric rotatory machine, comprising a rotor as defined in claim 1, wherein the axial retaining device is positioned between one of the two coil head regions and the corresponding support disc for said one of the two coil head regions, so that the at least one resilient element is in contact with the corresponding support disc.

9. An axial retaining device for a rotor of a rotatory electric machine, the rotor comprising a pack of plates mounted on a shaft, wherein said pack of plates comprises a region with slots, in which coils are housed and two coil head regions, wherein the ends of the coils are external to the pack of plates, the axial retaining device positioned in one of the two coil head regions (4), wherein:
- a substantially flat base positioned in said one of the two coil head regions; and
- at least one resilient element fixed to a face of the substantially flat base facing in a direction opposite to said one of the two coil head regions.

10. The axial retaining device according to claim 9, wherein:
- the substantially flat base comprises two indentations arranged on opposite edges of the substantially flat base, the two indentations being arranged in corresponding positions on the opposite edges forming anchoring points for a lashing strap to lash the axial retaining device to said one of the two coil head regions;
- the axial retaining device comprising two pairs of resilient elements, the pairs of resilient elements spaced from each other so as to form a gap through which the lashing strap passes.

* * * * *